United States Patent
Faugeras

(10) Patent No.: US 10,370,112 B2
(45) Date of Patent: Aug. 6, 2019

(54) PROPULSION ASSEMBLY FOR AN AIRCRAFT

(71) Applicant: SOCIETE LORRAINE DE CONSTRUCTION AERONAUTIQUE, Florange (FR)

(72) Inventor: José Faugeras, Elancourt (FR)

(73) Assignee: SOCIETE LORRAINE DE CONSTRUCTION AERONAUTIQUE, Florange (FR)

( * ) Notice: Subject to any disclaimer, the term of this patent is extended or adjusted under 35 U.S.C. 154(b) by 360 days.

(21) Appl. No.: 15/295,252

(22) Filed: Oct. 17, 2016

(65) Prior Publication Data

US 2017/0036772 A1 Feb. 9, 2017

Related U.S. Application Data

(63) Continuation of application No. PCT/FR2015/051025, filed on Apr. 15, 2015.

(30) Foreign Application Priority Data

Apr. 17, 2014 (FR) ...................................... 14 53493

(51) Int. Cl.
*B64D 29/06* (2006.01)
*B64D 27/16* (2006.01)
(Continued)

(52) U.S. Cl.
CPC ............. *B64D 29/06* (2013.01); *B64D 27/16* (2013.01); *B64D 33/02* (2013.01); *B64F 5/60* (2017.01)

(58) Field of Classification Search
CPC ........ B64D 29/06; B64D 27/16; B64D 33/02; B64F 5/60; F01D 9/042; F01D 25/24
(Continued)

(56) References Cited

U.S. PATENT DOCUMENTS 4,826,221 A * 5/1989 Harmon ................ E05B 63/128
292/106
4,828,299 A * 5/1989 Poe ........................ E05B 63/128
292/139

(Continued)

FOREIGN PATENT DOCUMENTS

FR 2757823 7/1998
FR 2916425 11/2008
(Continued)

OTHER PUBLICATIONS

International Search Report for International Application PCT/FR2015/051025, dated Jul. 9, 2015.

*Primary Examiner* — Aaron R Eastman
(74) *Attorney, Agent, or Firm* — Burris Law, PLLC

(57) ABSTRACT

The present disclosure relates to a propulsion assembly having a nacelle surrounding a turbojet engine, the nacelle having an upstream structure with an air inlet including an air inlet lip, the air inlet lip defining, with the air inlet lip, an air inlet chamber, the upstream structure being capable of translational movement along an axis parallel to a longitudinal axis of the nacelle, between a closed position and an open position that allows access to the turbojet engine. The propulsion assembly further includes at least one locking/unlocking device allowing and preventing movement of the upstream structure that in one form is fixed to the air inlet lip and to an upstream flange of the turbojet engine.

15 Claims, 4 Drawing Sheets

(51) Int. Cl.
B64D 33/02 (2006.01)
B64F 5/60 (2017.01)

(58) Field of Classification Search
USPC .......................................................... 415/123
See application file for complete search history.

(56) References Cited

U.S. PATENT DOCUMENTS

| | | | |
|---|---|---|---|
| 6,045,091 A * | 4/2000 | Baudu | B64D 29/06 239/265.25 |
| 6,325,428 B1 | 12/2001 | Do | |
| 2002/0195827 A1 | 12/2002 | Jackson | |
| 2003/0151261 A1* | 8/2003 | Porte | B64D 29/06 292/229 |
| 2005/0024815 A1* | 2/2005 | Pratt | B64D 29/06 361/600 |
| 2006/0138785 A1* | 6/2006 | Vauchel | E05C 19/145 292/113 |
| 2010/0171319 A1* | 7/2010 | Joret | B64D 29/06 292/96 |
| 2010/0314501 A1* | 12/2010 | Vauchel | B64D 29/06 244/53 B |
| 2011/0017843 A1* | 1/2011 | Le Coq | B64D 29/06 239/265.33 |
| 2012/0096730 A1* | 4/2012 | Vauchel | B64D 29/06 33/644 |
| 2017/0107943 A1* | 4/2017 | Franer | F01D 25/24 |
| 2017/0167439 A1* | 6/2017 | Crawford | F01D 25/24 |
| 2017/0284337 A1* | 10/2017 | Schrell | F02K 1/605 |
| 2018/0128028 A1* | 5/2018 | Hernandez | E05C 19/14 |

FOREIGN PATENT DOCUMENTS

| | | |
|---|---|---|
| FR | 2926537 | 7/2009 |
| FR | 2927061 | 8/2009 |
| FR | 2930763 | 11/2009 |

* cited by examiner

PROPULSION ASSEMBLY FOR AN AIRCRAFT

CROSS-REFERENCE TO RELATED APPLICATIONS

This application is a continuation of International Application No. PCT/FR2015/051025, filed on Apr. 15, 2015, which claims the benefit of FR 14/53493, filed on Apr. 17, 2014. The disclosures of the above applications are incorporated herein by reference.

FIELD

The present disclosure concerns a propulsion assembly for aircraft comprising a nacelle with movable upstream structure.

BACKGROUND

The statements in this section merely provide background information related to the present disclosure and may not constitute prior art.

An aircraft is propelled by one or more propulsion assemblies comprising a turbojet engine housed in a tubular nacelle. Each propulsion assembly is attached to the aircraft by a pylon generally located under a wing or the fuselage.

A nacelle generally has a substantially tubular structure comprising an upstream section defining an air inlet, a middle section intended to surround a fan of the turbojet engine, a downstream section capable of accommodating thrust reversal means and intended to surround the combustion chamber of the turbojet engine, and is generally ended by an ejection nozzle whose outlet is located downstream of the turbojet engine.

In the present application, the upstream and the downstream are defined with respect to the air flow direction in the operating propulsion assembly in direct jet mode, the air inlet being located upstream with respect to the ejection nozzle located downstream of the nacelle.

The maintenance operations of the turbojet engine require an easy access to the turbojet engine. To this end, the nacelle generally comprises two openings located at the lateral wall of the middle section of the nacelle, on either side of the pylon connecting the turbojet engine to the aircraft.

These two openings are each capable of being closed thanks to two half-cowls pivotally mounted with respect to an axis substantially parallel to a longitudinal axis of the nacelle.

These half-cowls are displaced between a closed position according to which they close the openings of the nacelle, and an open position according to which they open the openings of the nacelle so as to allow an access to the turbojet engine for maintenance operations, the holding of these half-cowls in the open position being performed by means of support feet.

A drawback of this type of cowl is that the access to the turbojet engine is limited by the presence of support feet which hold the half-cowls in the open position. Furthermore, an unexpected closure of these cowls can happen at any time during a maintenance operation, which represents a significant hazard to the operators.

In order to overcome these drawbacks, a solution of the prior art, such as that described in the document FR 2 930 763, consists in expecting a nacelle whose upstream and middle sections form a unitary assembly, which may be displaced along rails mounted on the turbojet engine between a closed downstream position ensuring, with a downstream structure of the nacelle, the aerodynamic continuity of the nacelle, and an open upstream position allowing the access to the turbojet engine in order to perform maintenance operations.

The holding of the upstream structure of the nacelle in the closed position is performed at the pylon attaching the propulsion assembly to the aircraft, thanks to a plurality of hooks cooperating with corresponding elements positioned at the pylon.

The displacement of the upstream structure of the nacelle from its closed downstream position to its open upstream position is performed in two stages. Firstly, an operator unlocks the hooks, then opens several handles configured, when they are in the open position, to allow a slight rotation of the cowl in order to disengage the hooks from the elements of the pylon with which they cooperate.

Once the rotation of the cowl performed, the displacement towards the upstream of the upstream structure can occur.

This type of structure advantageously allows an operator to access more easily and safely the turbojet engine.

However, a first drawback is that the opening kinematic is relatively long and complex.

A second drawback is that this type of structure is fragile due to significant aerodynamic forces generated in flight at the area near the air inlet lip of the nacelle, area not connected to the rest of the propulsion assembly.

A solution to the problem of the fragility of the structure might be to provide longitudinal spars disposed over all the length of the upstream structure of the nacelle.

This solution is satisfactory from a structural point of view, in that the presence of rails allows starting again the aerodynamic forces generated at the air inlet lip of the nacelle. However, such spars significantly increase the mass of the nacelle and their presence is therefore not acceptable.

SUMMARY

The present disclosure relates to a propulsion assembly for an aircraft comprising a nacelle in which a turbojet engine is housed, the nacelle comprising:
  a downstream structure, and
  an upstream structure, upstream of the downstream structure, said upstream structure comprising:
    an air inlet having an air inlet lip forming the leading edge of the nacelle, and
    a frame of the air inlet lip defining an annular partition separating the air inlet lip from the air inlet of the rest of the nacelle and defining, with the air inlet lip, an air inlet box,
  the upstream structure being movable in translation along an axis substantially parallel to a longitudinal axis of the nacelle, alternately between a closed position according to which it provides an aerodynamic continuity with the downstream structure of the nacelle, and an open position according to which it opens a passage in the nacelle so as to allow an at least partial access to the turbojet engine,
  said propulsion assembly further comprising at least one locking/unlocking device adapted for alternately allowing and preventing the displacement of the upstream structure relative to the downstream structure, comprising locking and unlocking device of the upstream structure of the nacelle on the turbojet engine,
  said assembly being noteworthy in that the locking and unlocking device is fastened to the frame of the air inlet lip and an upstream flange of the turbojet engine.

Thus, by providing a locking and unlocking device of the upstream structure of the nacelle, movable in translation relative to the turbojet engine, positioned at the frame of the air inlet lip and of the upstream flange of the turbojet engine, the nacelle resists the aerodynamic forces generated at the air inlet lip. The positioning of the locking and unlocking device at an upstream portion of the nacelle provides an axial locking and an accurate radial positioning of the upstream structure of the nacelle relative to the turbojet engine, which allows avoiding limiting the aerodynamic losses between the air inlet lip and the turbojet engine.

Furthermore, by favoring a fastening of the locking and unlocking device directly to the frame of the air inlet lip defining an annular partition separating the air inlet lip from the rest of the nacelle, and not on the air inlet lip itself, the rigidity is substantially increased, at least in the radial direction, of the fastening of the upstream structure of the nacelle of the turbojet engine.

Furthermore, the present disclosure advantageously allows overcoming the necessity for any longitudinal spars disposed along the upstream structure of the nacelle, as it may be the case in the prior art. By overcoming the necessity for longitudinal spars disposed along the upstream structure of the nacelle, the mass of the nacelle is significantly reduced relative to the prior art.

Furthermore, the safety of the locking/unlocking device is reinforced in that the locking and unlocking device is located upstream of the fan casing, in an area outside of those which can be reached by the fan blades in the case of rupture of the fan blades and outside the hot area. Thus, the probability of an unexpected opening of the upstream structure of the nacelle in flight is significantly reduced relative to the prior art.

The locking and unlocking device according to the present disclosure comprises:
  a stop fastened on the upstream flange of the turbojet engine, and
  a locking hook secured to the upstream structure of the nacelle, movable between a locking position according to which it cooperates with said stop so as to hold the upstream structure of the nacelle in the closed position and an unlocking position according to which it releases said stop so as to allow a switching of the upstream structure of the nacelle from its closed position towards its open position.

The locking/unlocking device according to the present disclosure comprises a device for actuating the locking and unlocking device including a control rod whose one end is connected to the locking hook, shaped to displace the locking hook alternately between its locking and unlocking position.

Furthermore, the locking and unlocking device comprises a suitable safety latch adapted to form a safety stop of the locking hook so as to hold the locking hook in its locking position, which advantageously allows reinforcing the safety of the locking/unlocking, and consequently avoiding an unexpected opening of the upstream structure of the nacelle during a flight phase of the aircraft.

Furthermore, the control rod comprises a device for displacing the safety latch alternately between a locking position according to which said latch cooperates with the locking hook and an unlocking position according to which said latch releases the locking hook.

Advantageously, the same control rod acts on both the safety hook and on the locking latch.

More particularly, the device for displacing the safety latch, alternately between its locking position and its unlocking position, comprises a control finger of the safety latch secured to the control rod, said finger being also secured to a safety connecting rod connected to the safety latch so as to cause, for a predetermined stroke of the control rod, the safety latch alternately between its locking position and its unlocking position.

Thus, the unlocking kinematic of the upstream structure of the nacelle is largely simplified relative to the prior art in that when the locking/unlocking device is in the locking position, the displacement of the control rod causes, at first, the unlocking of the safety latch so as to release the locking hook then, when the control rod continues its stroke, said rod displaces the hook from its locking position to its unlocking position, allowing the displacement of the upstream structure of the nacelle in order to perform maintenance operations of the turbojet engine.

Advantageously, the control finger of the safety latch is mounted in a guide which is part of a support secured to the upstream structure of the nacelle, allowing supporting the locking/unlocking device in case of rupture of the control rod. Thus, even in a situation of rupture of the control rod, the locking and unlocking device does not collapse, and the control finger of the safety latch can be manually displaced by an operator.

Optionally, the safety latch comprises an elastic device adapted to return the safety latch in the locking position.

The mounting of the locking/unlocking device is further simplified in that the locking hook and the safety latch are pivotally mounted about axes substantially parallel to an axis transverse to the longitudinal axis of the nacelle.

Finally, the actuating device comprises at least one control handle directly accessible from the outside of the nacelle, adapted to drive the control rod in movement.

Such a handle, directly accessible from the outside of the nacelle, can directly act on the locking and the unlocking of the locking hook, without prior disassembly of a portion of the nacelle.

The accessibility to the turbojet engine during maintenance operations is thus largely facilitated relative to the prior art, in that it is no longer necessary to clear the downstream structure in order to access the locking/unlocking device of the upstream structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
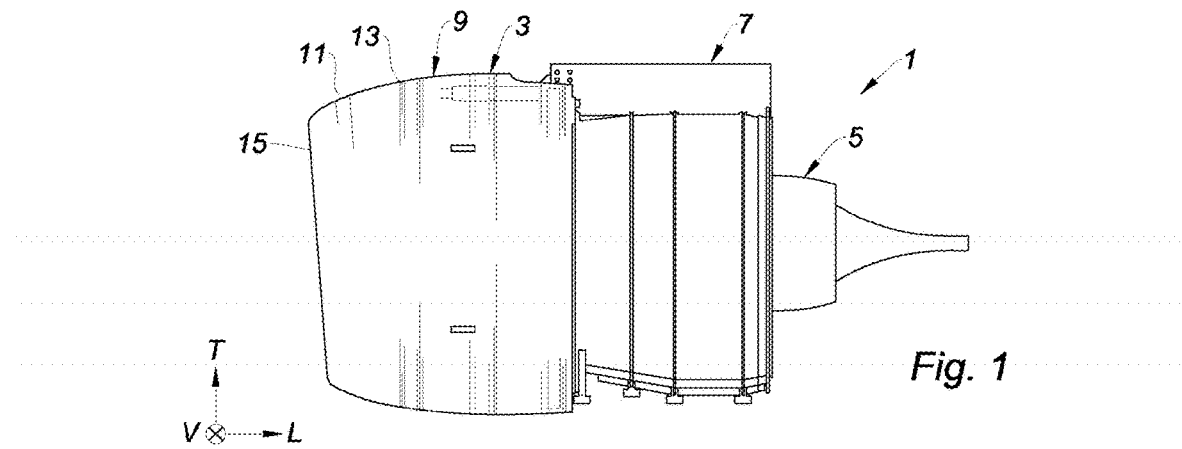
FIG. 1 shows a propulsion assembly according to the present disclosure seen from the side on which the downstream structure of the nacelle has been hidden.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is noteworthy that in the description and the claims, the terms "upstream" and "downstream" should be understood relative to the circulation of the air flow inside the propulsion assembly formed by the nacelle and the turbojet engine, that is to say from the left to the right with reference to FIGS. 1 to 7.

Similarly, the expressions "inner" and "outer" will be used, by a non-limiting way, with reference to the radial distance relative to the longitudinal axis of the nacelle, the expression "inner" defining an area radially closer to the longitudinal axis of the nacelle, as opposed to the expression "outer."

Figure 3:
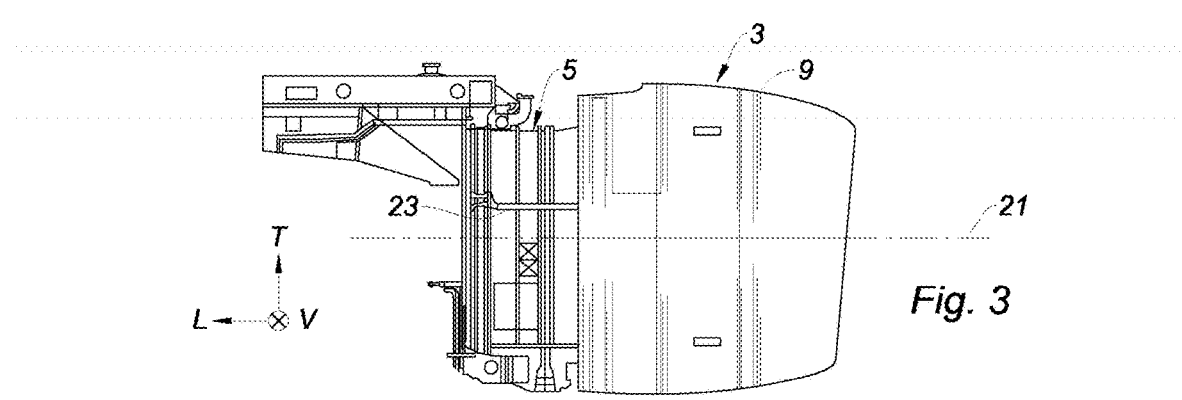

Furthermore, in the description and the claims, in order to clarify the description and the claims, the terminology longitudinal, vertical and transverse will be adopted by a non limiting way, with reference to the direct trihedron L, V, T indicated in the figures, whose longitudinal axis L is parallel to the longitudinal axis 21 of the nacelle shown in FIG. 3.

Furthermore, on all the figures, identical or similar numerical references show members or assemblies of identical or similar members.

Referring to FIG. 1, schematically showing a propulsion assembly according to the present disclosure, on which the downstream structure of the nacelle has been hidden.

The propulsion assembly 1 according to the present disclosure comprises a nacelle 3 in which a turbojet engine 5 is housed. The propulsion assembly 1 is intended to be attached to a wing or fuselage of the aircraft by a pylon 7.

The nacelle 3 comprises an upstream structure and a downstream structure 9, likely to accommodate thrust reversal means, hidden from the figures, directly positioned downstream of the upstream structure 9.

The upstream structure 9 of the nacelle 3 comprises an air inlet 11 extended in its downstream portion by an annular cowl 13.

Figure 4:
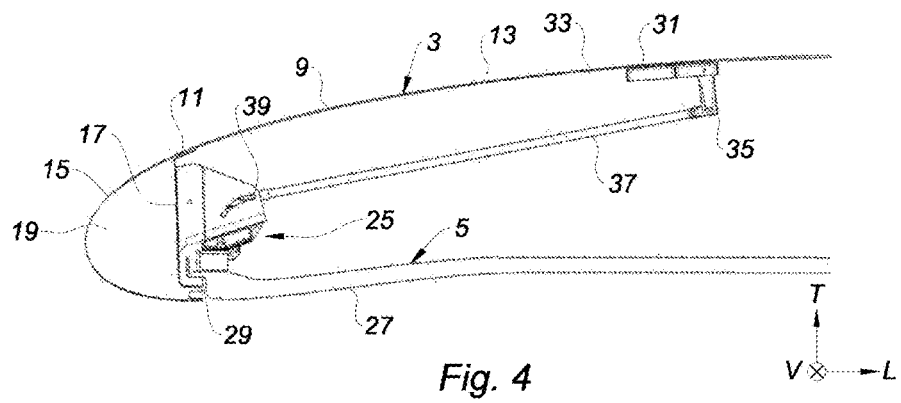
FIG. 4 is a partial longitudinal section of the upstream structure of the nacelle shown in the closed position, and of the area of the turbojet engine placed opposite to each other according to the teachings of the present disclosure.

The air inlet 11 comprises an air inlet lip 15 forming a leading edge of the nacelle, and a frame 17 of the air inlet lip defining, with the inlet lip air, an air inlet box 19 (the frame 17 and the box 19 being visible in FIG. 4).

The frame 17 of the air inlet lip matches a form of partition, for example annular. This annular partition is directly positioned downstream of the air inlet lip 15, that is to say that the frame 17 defines the first partition encountered in the nacelle from the air inlet lip 15 when the nacelle is crossed from the upstream to the downstream. In other words, the frame 17 of the air inlet lip is in the shape of an annular partition separating the air inlet lip 15, forming the leading edge of the nacelle, from the rest of the air inlet 11 of the nacelle.

Figure 2:
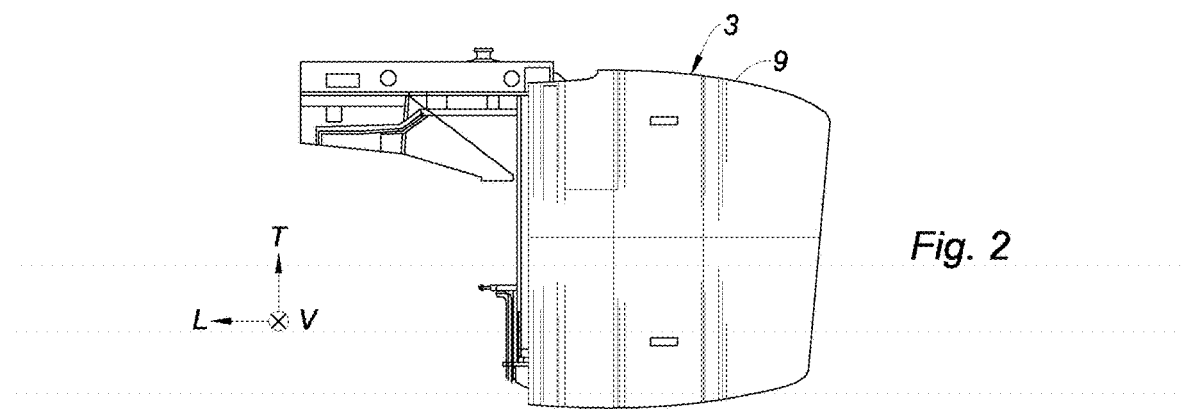
FIGS. 2 and 3 show the nacelle of the propulsion assembly according to the present disclosure, respectively in the closed position and in the open position according to which the upstream structure of the nacelle is translated toward the upstream of the nacelle, the downstream structure of the nacelle have been hidden again.

Referring to FIGS. 2 and 3, illustrate the nacelle 3 respectively in a closed position and in an open position allowing uncovering the turbojet engine 5 so as to allow its maintenance.

The upstream structure 9 of the nacelle is movable in translation along an axis substantially parallel to a longitudinal axis 21 of the nacelle. The translation of the upstream structure 9 is for example performed thanks to a rail/guide rail system comprising a plurality of rails 23 supported by the turbojet engine, for example four, for example equidistantly distributed on the periphery of the turbojet engine, said rails cooperating with guide rails mounted on the upstream structure of the nacelle.

The upstream structure is movable alternately between a downstream closed position, according to which it provides an aerodynamic continuity with the downstream structure (hidden in FIGS. 2 and 3) of the nacelle, and an upstream open position, according to which it opens a passage in the nacelle so as to allow an at least partial access to the turbojet engine 5.

The propulsion assembly 1 is displaced from its position shown in FIG. 2 to its position shown in FIG. 3 in order to allow the maintenance of the turbojet engine. When the aircraft is operating, the propulsion assembly is in its closed position shown in FIG. 2, that is to say that the upstream structure 9 of the nacelle 3 provides an aerodynamic continuity with the downstream structure (not shown) of the nacelle.

In order to provide the holding of the propulsion assembly in the closed position when the aircraft is in flight, and consequently to prevent an unexpected opening of the upstream structure of the nacelle, and in order to allow the switching of the propulsion assembly to the open position allowing an access to the turbojet engine, the propulsion assembly according to the present disclosure is equipped with several locking/unlocking devices 25, for example four, for example equidistantly distributed along the periphery of the propulsion assembly.

A locking/unlocking device 25 is illustrated in FIG. 4, figure to which reference is currently made.

FIG. 4 is a partial longitudinal sectional view of the upstream structure 9 of the nacelle and of the area of the turbojet engine 5 placed opposite to each other.

The locking/unlocking device 25 is adapted to alternately allow and inhibit the displacement of the upstream structure 9 of the nacelle relative to the downstream structure of the nacelle.

To this end, the locking/unlocking device 25 is of the upstream structure 9 of the nacelle 3 of the turbojet engine 5.

When the aircraft is in a mode other than that of the maintenance of the turbojet engine, the upstream structure 9 is held in its closed position by means of a locking device adapted for holding together the upstream structure of the nacelle and the turbojet engine 5 at an upstream area 27 of the turbojet engine 5.

According to the present disclosure, the locking and unlocking device, described in more details in the following description, are fastened to the frame 17 of the air inlet lip 15 and on an upstream flange 29 of the turbojet engine 5.

The locking/unlocking device according to the present disclosure also comprises a device for actuating the locking and unlocking device, the actuating device allowing alternately switching the locking/unlocking device between a locked position according to which it holds together the upstream structure of the nacelle and the turbojet engine the so as to inhibit any relative movement between the upstream structure and the turbojet engine, and an unlocked position according to which it releases the upstream structure of the nacelle so as to allow its displacement.

According to the present disclosure, the actuating device in one form comprises a control handle 31 directly accessible from the outside of the nacelle, without handling the nacelle, flush with the outer wall 33 of the upstream structure 9 of the nacelle when the upstream structure is in the closed position.

The control handle 31 is pivotally mounted on an axis substantially transverse to the longitudinal axis of the nacelle. The handle 31 is substantially "L"-shaped and is connected to one end 35 of a control rod 37, so that the pivoting of the control handle 31 causes a displacement in translation of the control rod 37.

The control rod is positioned between the annular cowl 13 extending the air inlet 11 of the nacelle, and the upstream area 27 of the turbojet engine when the upstream structure 9 of the nacelle is in the closed position.

Figure 5:
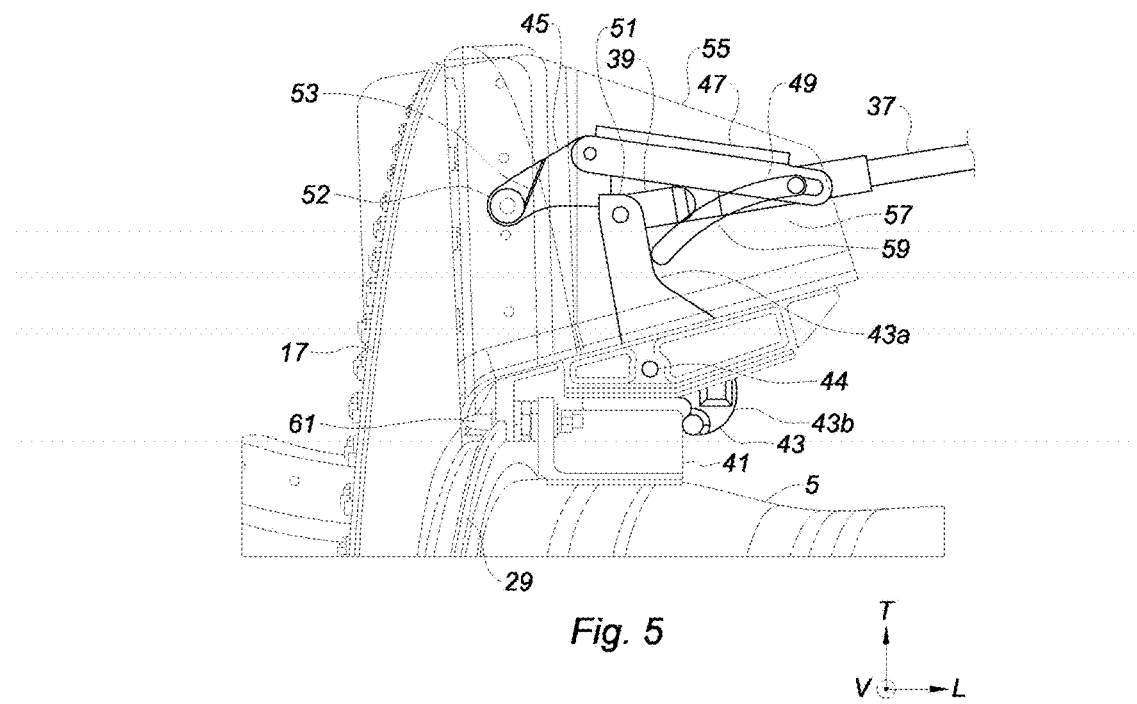
FIGS. 5 to 7 illustrate the progressive opening kinematic of the upstream structure of the nacelle according to the teachings of the present disclosure.

The control rod 37 is itself connected by its end 39 to the locking and unlocking device illustrated in FIG. 5, figure to which reference is currently made.

In FIG. 5, the air inlet lip 15 and the annular cowl 13 which extends it, have been hidden, and the locking and unlocking device are shown in the locking position according to which the upstream structure of the nacelle is held on the turbojet engine.

The locking and unlocking device in this form comprises a stop 41 fastened on the upstream flange 29 of the turbojet engine, and a locking hook 43 engaging the end 39 of the control rod 37.

More specifically, the locking hook 43 is secured of the upstream structure of the nacelle, and is pivotally mounted on an axis 44 substantially parallel to an axis transverse to the longitudinal axis of the nacelle, driven in rotation by the end 39 of the control rod 37 between a locking position shown in FIG. 5, according to which it cooperates with the stop 41 so as to hold the upstream structure of the nacelle in the closed position, and an unlocking position (visible in FIG. 7) according to which it releases said stop so as to allow a switching of the upstream structure of the nacelle from its closed position towards its open position.

More specifically, the locking hook 43 comprises a portion 43a connected to the end 39 of the control rod 37, separated from a portion 43b by means of a prestressed compression spring 46 (visible in FIG. 7) allowing the backlash and holding a pressure of the locking hook 43 on the stop 41 when the hook is in its locking position according to which it cooperates with the stop 41.

The locking and unlocking device further comprise a safety latch 45 connected to the control rod 37 by means of a safety connecting rod 47 engaged with a control finger 49 secured to the safety latch secured to the control rod.

In the position illustrated in FIG. 5, according to which both the safety latch 45 and the locking hook 43 are shown in the locking position, the end portion 51 of the locking hook 43 cooperates with the safety latch 45, thus constituting a safety stop preventing any movement of the locking hook 43 when the upstream structure is in its closed position. The locking hook 43 bears then on the stop 41, so that the movement of the upstream structure of the nacelle upstream of the nacelle is inhibited.

The safety latch 45 is pivotally mounted on a rod 52 constituting a pivoting connection of axis substantially parallel to a transverse axis to the longitudinal axis of the nacelle.

The holding of the safety latch 45 in its locking position is performed through an elastic device such as a torsion spring 53 which is wound on the rod 52, permanently returning the safety latch in its locking position.

The rod 52 is supported by a support 55 fastened on the frame 17 of the air inlet lip. Such a support 55 is for example constituted by a spar portion, and has a transverse section substantially U-shaped.

The unlocking kinematic will now be described with reference to FIGS. 4 to 7.

The operator takes hold of the control handle 31 and exerts a rotation of the handle clockwise. The rotation of the control handle 31 causes the displacement in translation of the control rod 37 in the upstream direction of the nacelle.

Figure 6:
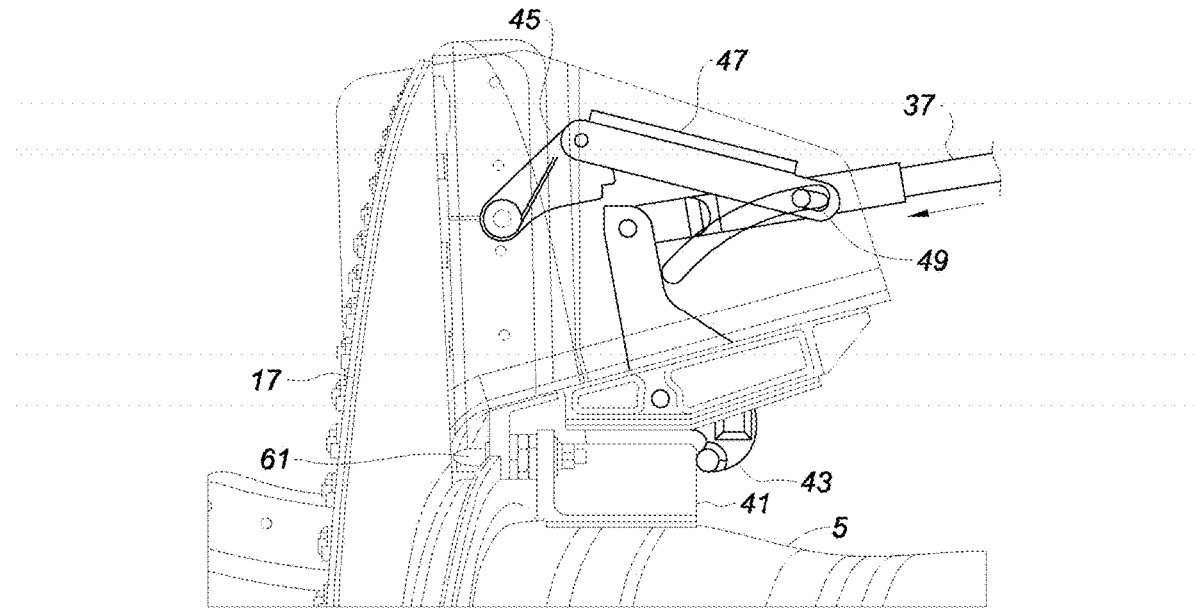

As illustrated in FIG. 6, the displacement of the control rod 37 of a few millimeters, for example 8 mm, upstream of the nacelle, causes, at first, the displacement of the control finger 49 of the safety latch by a few millimeters without causing the pivoting of the locking hook 43. The control finger of the safety latch, secured to the control rod, causes the pivoting of the safety rod 47, itself causing the pivoting of the safety latch 45, allowing causing the displacement of the safety latch from its locking position to its unlocking position.

At this stage of the unlocking process, the hook 43 is still in the locking position, that is to say that it always cooperates with the stop 41, so that the displacement of the upstream structure of the nacelle to the upstream is not allowed.

Figure 7:
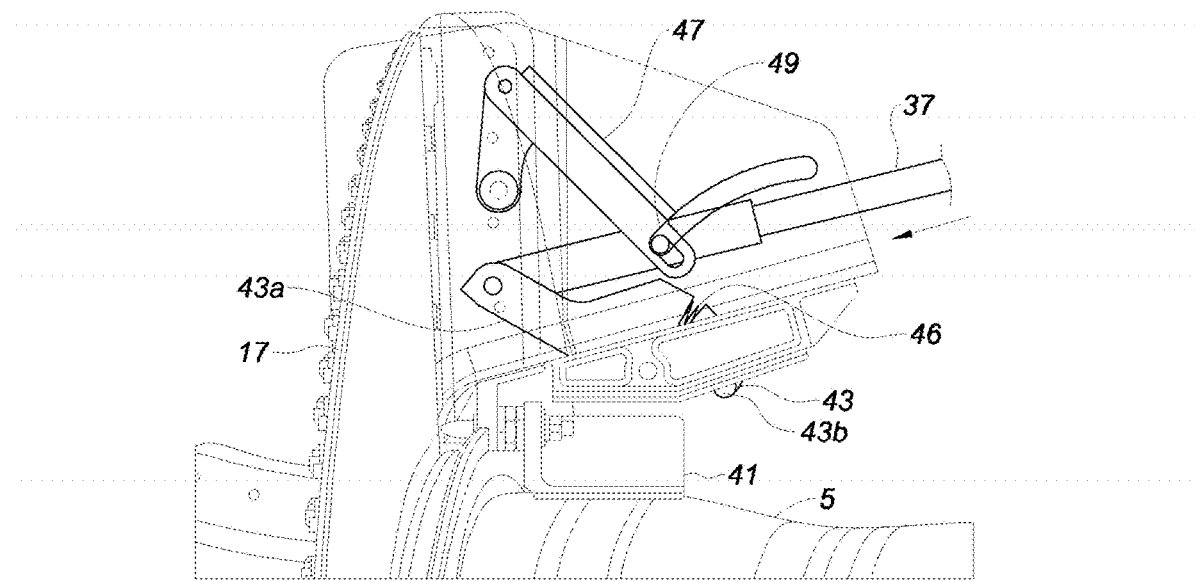

By continuing the rotation of the control handle 31, the control rod 37 continues to be displaced in the upstream direction of the nacelle, as illustrated in FIG. 7, which allows causing the pivoting of the locking hook 43.

The pivoting of the locking hook 43 then releases the stop 41 and no longer cooperates with the stop 41, making possible the displacement of the upstream structure of the nacelle upstream of the nacelle.

Figure 8:
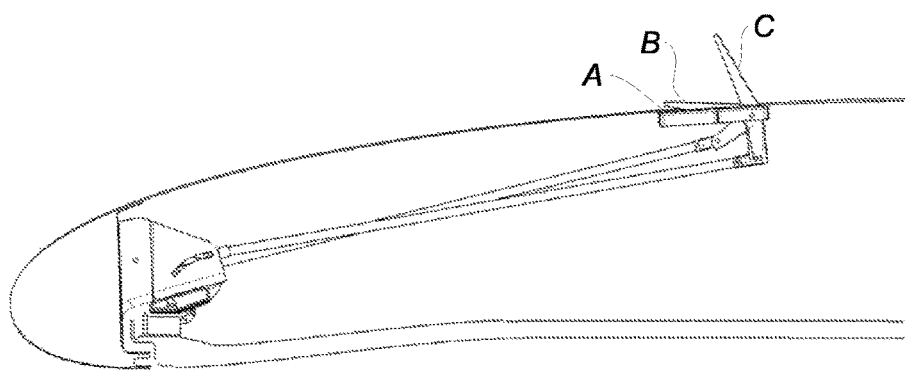
FIG. 8 illustrates the kinematic of the rotation of a control handle according to the teachings of the present disclosure.

The rotation kinematic of the control handle 31 is illustrated in FIG. 8 on which are shown the three positions A, B and C of the handle, respectively corresponding to a locking position of the locking hook and the safety latch, to a locking position of the locking hook and an unlocking position of the safety latch, and to an unlocking position of the locking hook and the safety latch.

The maintenance operations of the turbojet engine can thus be performed.

Such a displacement of the upstream structure of the nacelle can be performed either manually thanks to the control handle 31, or automatically by means of actuating means such as cylinders, not shown.

As shown in FIGS. 5 to 7, the support 55 further comprises on each of its lateral walls 57 a guide 59 inscribed in a plane XZ and having a substantially circular profile.

The guide 59 is shaped to receive the control finger 49 of the safety latch which is mounted on the safety connecting rod 47, which allows holding the locking/unlocking device in case of rupture of the control rod 37.

The control finger 49 of the safety latch may be mounted so as to cross the guide 59, and can serve as a means for manually displacing the safety connecting rod 47 in case of rupture of the control rod 39. The manual displacement of the safety connecting rod is performed by manually displacing the control finger 49 of the safety latch for example thanks to a rod, by means of a rod. The manual displacement of the control finger 49 of the safety latch then causes the pivoting of the safety connecting rod 47, and together the pivoting of the safety latch 45.

When the maintenance operations are finished, the operator brings the upstream structure of the nacelle in its downstream closed position, according to which it defines, together with the downstream structure of the nacelle an aerodynamic continuity.

The locking of the upstream structure of the nacelle on the turbojet engine is performed as follows:

The operator brings the upstream structure of the nacelle in its position according to which it cooperates with the turbojet engine, position shown in FIGS. 4 to 7. The proper alignment of the upstream structure of the nacelle relative to the turbojet engine is provided thanks to center finders 61 fastened on the upstream flange 29 of the turbojet engine, engaging bores positioned opposite to the frame of the air inlet lip.

The operator then pivots the control handle 31 in the counterclockwise direction, which has the effect of displacing the control rod 37 downstream of the nacelle, and to cause, at first, the pivoting of the locking hook 43 from its position shown in FIG. 7 to its position shown in FIG. 6, according to which the hook 43 cooperates with the stop 41. The safety latch 45 is always in the unlocking position until the pivoting of the control handle 31 has caused the downstream displacement of the control finger 49 of the safety latch, causing, in its turn, the pivoting of the safety connecting rod 47 and, together, that of the safety latch 45, until said hook cooperates with the locking hook 43.

Alternatively to what has been described, the locking and unlocking device is devoid of the safety latch, and the holding of the upstream structure of the nacelle on the turbojet engine is performed only by the locking hook mounted at the end of the control rod.

Thanks to the present disclosure, the nacelle resists aerodynamic forces generated at the air inlet lip while overcoming the necessity of longitudinal spars disposed along the upstream structure of the nacelle, which allows significantly reducing the mass of the nacelle relative to the prior art.

Furthermore, the safety of the nacelle is reinforced in that the locking and unlocking device of the upstream structure of the nacelle are upstream of the fan casing, in an area outside of those which can be reached by blades of the fan in case of rupture of the blades of the fan and outside of the hot area.

Thus, the risk of unexpected opening of the upstream structure of the nacelle in flight is reduced.

Furthermore, as described hereinabove, the unlocking kinematic of the upstream structure of the nacelle is significantly simplified relative to the prior art.

Also, by the presence of a control handle directly accessible from the outside of the nacelle, a direct action on the locking and the unlocking of the locking hook, without prior disassembly of a portion of the nacelle, is now possible, which largely simplifies accessibility to the turbojet engine during maintenance operations.

It goes without saying, the present disclosure is not limited solely to the forms of the propulsion assembly, described hereinabove only by way of illustrative examples, but it encompasses, on the contrary, all the variants involving the technical equivalents of the present disclosure as well as the combinations thereof.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A propulsion assembly for aircraft comprising a nacelle in which a turbojet engine is housed, the nacelle comprising:
   a downstream structure; and
   an upstream structure upstream of the downstream structure, said upstream structure comprising:
      an air inlet comprising an air inlet lip forming a leading edge of the nacelle, and
      a frame of the air inlet lip defining an annular partition separating the air inlet lip from a remainder of the air inlet of the nacelle and defining, with the air inlet lip, an air inlet box,
   the upstream structure being movable in translation along an axis substantially parallel to a longitudinal axis of the nacelle, alternately between a closed position according to which the upstream structure provides an aerodynamic continuity with the downstream structure of the nacelle, and an open position along which the upstream structure opens a passage in the nacelle so as to allow at least partial access to the turbojet engine,
   said propulsion assembly further comprising at least one locking/unlocking device adapted to alternately allow and prevent displacement of the upstream structure relative to the downstream structure, the locking/unlocking device being fastened on the frame of the air inlet lip and an upstream flange of the turbojet engine.

2. The propulsion assembly according to claim 1, wherein the locking/unlocking device comprises:
   a stop fastened to the upstream flange of the turbojet engine; and
   a locking hook secured to the upstream structure of the nacelle, movable between a locking position according to which the locking hook cooperates with said stop so as to hold the upstream structure of the nacelle in the closed position, and an unlocking position according to which the locking hook releases said stop so as to allow a switching of the upstream structure of the nacelle from its closed position towards its open position.

3. The propulsion assembly according to claim 2, wherein the locking/unlocking device comprises an actuating device for actuating the locking/unlocking device comprising a control rod having one end connected to the locking hook and shaped to displace the locking hook alternately between its locking and unlocking positions.

4. The propulsion assembly according to claim 3, wherein the actuating device for actuating the locking and unlocking means comprises at least one control handle directly accessible from an outside of the nacelle, said handle being adapted to drive the control rod in displacement.

5. The propulsion assembly according to claim 4, wherein the at least one control handle is flush with an outer wall of the upstream structure of the nacelle when the upstream structure is in the closed position.

6. The propulsion assembly according to claim 4, wherein the control rod is connected to the at least one control handle.

7. The propulsion assembly according to claim 2, wherein the locking/unlocking device further comprises a safety latch adapted to form a stop of the locking hook so as to hold the locking hook in its locking position.

8. The propulsion assembly according to claim 7, wherein the control rod comprises a device for displacing the safety latch alternately between a locking position according to which said safety latch cooperates with the locking hook and an unlocking position according to which said safety latch releases the locking hook.

9. The propulsion assembly according to claim 8, wherein said device for displacing the safety latch, alternately between its locking position and its unlocking position, comprises a control finger of the safety latch secured to the control rod, said finger being also secured to a safety rod connected to the safety latch so as to drive, for a predetermined stroke of the control rod, the safety latch alternately between its locking position and its unlocking position.

10. The propulsion assembly according to claim 9, wherein the control finger of the safety latch is mounted in a guide which is inscribed in a support secured to the upstream structure of the nacelle.

11. The propulsion assembly according to claim 7, wherein the safety latch comprises an elastic device adapted to return the safety latch to its locking position.

12. The propulsion assembly according to claim 7, wherein the locking hook and the safety latch are pivotally mounted about axes substantially parallel to an axis transverse to the longitudinal axis of the nacelle.

13. The propulsion assembly according to claim 1, wherein the locking/unlocking device comprises a control rod having a first end disposed adjacent to the frame and a second end opposing the first end and extending in a direction away from the air inlet.

14. The propulsion assembly according to claim 13, wherein the locking/unlocking device further comprises at least one control handle connected to the second end of the control rod.

15. The propulsion assembly according to claim 1, wherein the upstream flange is disposed at an upstream end of the turbojet engine.

* * * * *